United States Patent [19]

Biegel et al.

[11] 4,111,403
[45] Sep. 5, 1978

[54] APPARATUS FOR THE TREATMENT OF THE OUTER CONTOUR OF A WORM CONVEYOR

[75] Inventors: Peter Biegel; Anton Dumont, both of Cologne, Germany

[73] Assignee: Klöckner-Humboldt-Deutz Aktiengesellschaft, Germany

[21] Appl. No.: 718,823

[22] Filed: Aug. 30, 1976

[30] Foreign Application Priority Data

Aug. 30, 1975 [DE] Fed. Rep. of Germany ....... 2538734

[51] Int. Cl.² .............................................. B23K 7/10
[52] U.S. Cl. .......................................... 266/58; 266/64
[58] Field of Search ........................ 266/58, 61, 62, 64

[56] References Cited

U.S. PATENT DOCUMENTS

| 883,798 | 4/1908 | Gregory | 266/58 X |
|---|---|---|---|
| 1,774,865 | 9/1930 | Allison | 266/58 |
| 2,726,450 | 12/1955 | Ware | 266/57 X |

FOREIGN PATENT DOCUMENTS

| 4,322,188 | 9/1968 | Japan | 266/58 |
|---|---|---|---|
| 286,809 | 3/1928 | United Kingdom | 266/64 |

Primary Examiner—Roy Lake
Assistant Examiner—Paul A. Bell
Attorney, Agent, or Firm—Hill, Gross, Simpson, Van Santen, Steadman, Chiara & Simpson

[57] ABSTRACT

A worm is rotated while a cutting torch trims the edge of the worm. The torch is mounted on an arm along with a wheel which bears against the thrust surface of the worm. The arm is mounted on one part of a carriage, the carriage moving along a guide rail under the motive influence of the worm. A pattern corresponding to the desired contour of the worm acts as a cam for the part of the carriage which carries the torch.

15 Claims, 4 Drawing Figures

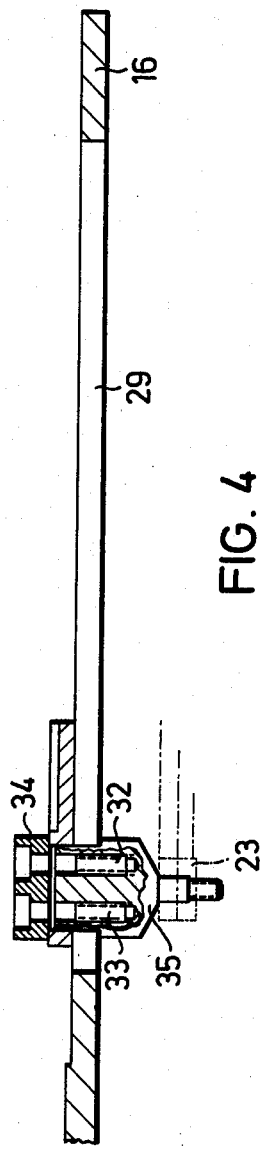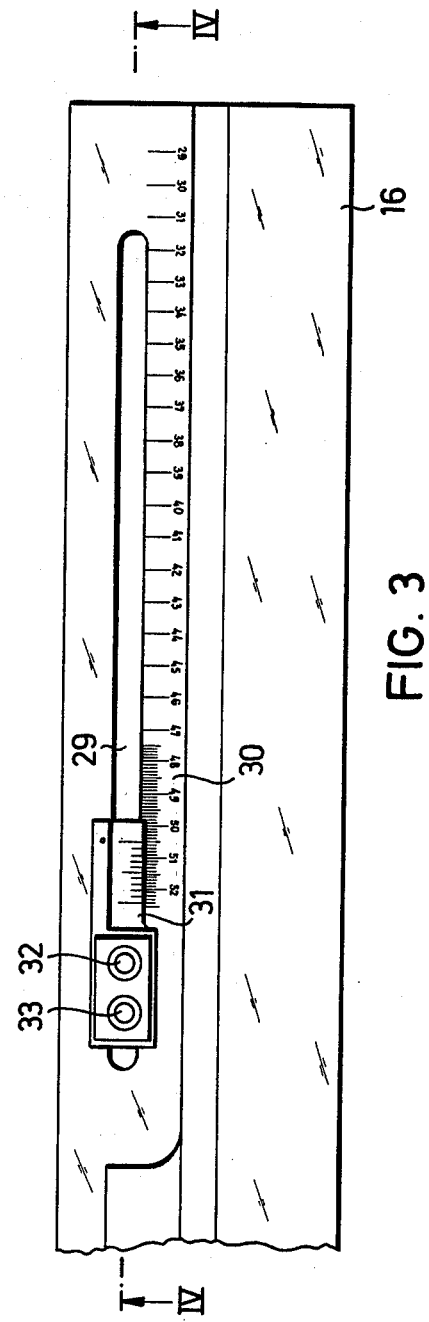

APPARATUS FOR THE TREATMENT OF THE OUTER CONTOUR OF A WORM CONVEYOR

BACKGROUND OF THE INVENTION

1. Field of the Invention

The invention relates to a method and to an apparatus for treating the outer contour of a worm conveyor, which is rotatably positioned about its axis of rotation, and is connected with a rotary drive, with a non-rotating treatment tool, which is applicable to the outer contour of the worm coils or helices.

2. Description of the Prior Art

In order to provide the worm conveyor to an accurately measured outer diameter, it is known to produce the worm first with an excess diameter and then to grind off the excess. For this purpose, the worm is mounted at both ends and set in rotation. A grinding tool is then applied to the outer edges of the worm coils or helices and the excess is ground off little by little, and indeed for as long as necessary until the worm has the finished measurement. Finally, the resulting grinding hairs or burrs must still be ground away in a single operative step. It is understood that as a result, this manner of operation has a number of disadvantages. The grinding off of the excess in the case of threaded worm sizes takes several days or even weeks, particularly if the worm coils to be ground to finished size for example have a hard metal layer on their thrust sides. If the coils also have at their outer face surfaces a hard metal coating, then the latter is ground away in undesired manner. The wear on the grinding tool is high. All in all, the treatment costs, in the case of the known methods of production of accurately dimensioned worms, are very high.

SUMMARY OF THE INVENTION

The object of the invention, therefore, is to provide a method and apparatus for treating the outer contour of worm conveyors which is simple in construction and reliable in operation, and with which conveyor worms, particularly such as have a hard metal layer may be trimmed very rapidly and without high costs to an accurately measured diameter.

This object is achieved with an apparatus of the type mentioned at the beginning according to the invention, that the treatment tool is a cutting torch or blowpipe with a combustion nozzle which is directed parallel to the axis of rotation of the worm conveyor and is held at its convolutions at a small spacing and which upon rotation of the worm in direction of feed of the worm coils moves along its outer contour translatorily.

In the case of the apparatus constructed according to the invention, the coils of a conveyor worm to be treated move past the nozzle of a cutting torch or blowpipe, which cleanly and very rapidly burns off the excess edge material of the worm, so that thereafter the worm has its finished measurement. The cutting torch or blowpipe may be an autogenous burner. According to a special feature of the invention, the cutting torch or blowpipe is a plasma burner. The torch may also be an electron beam torch, a laser torch or the like, and the term torch, as used herein, means a cutting tool of any suitable design. The plasma burner is in position to burn through very rapidly and without problems worm coils with a hard metal layer. The section surface is so clean that it does not have to be further treated. Upon adjustment of the correct combustion speed, the plasma burner causes no combustion hairs or burrs. With apparatus constructed according to the invention, worms which previously for example had to be ground to completion in 22 days, permit of being burnt at the same worm size in about 3 hours to an accurately dimensioned finished diameter.

According to a further feature of the invention, the apparatus according to the invention is characterized by a runway or guide arranged along or longitudinally to the worm conveyor on which a carriage is drivable, from which projects an arm, on which the burner, particularly plasma burner is held, as well as adjacent and with slight spacing from the same and disposed more to the center of the worm, a scanning roller, which constantly bears on the thrust side of the worm coils and which automatically displaces the burner carriage with the conveying speed of the worm. So that the burner is movable in both coordinate-directions, the burner carriage preferably consists of a drivable lower part and an upper part drivable transversely thereto. The cutting torch or blowpipe, particularly plasma burner, is guided by means of the scanning roller and by means of a guide roller, which upon gas or flame-cutting of the conveyor worm, travels on a guide path, which extends parallel to the outer contour of the finished worm. Thereby worms with different outer diameters and contours may be produced rapidly and without problems.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 3 is an enlarged scale plan view the measuring device for the adjustment of the guide roller of the combustion carriage of FIG. 1; and FIG. 4 is a section taken along the line IV—IV of FIG. 3.

In FIG. 1 the outline of a conveyor worm which is to be brought to an exactly dimensioned outer diameter is illustrated by the broken lines 10. The worm 10 is journaled at both ends and is rotatably positioned about its axis of rotation. Thus, the worm may be mounted between the chuck and the headstock of a rotary machine. Through a continuously regulable rotary drive, not shown, the worm 10 may be set in rotation in the direction of the arrow 11. The worm serves, for example, for the later installation in a solid-sleeve-centrifuge, from which it ejects the deposited solids. The worm has a coil 12 wound to the right, of which in FIG. 1 only the starting piece is to be seen to the left in section. On the thrust side of the worm coil 12 is applied a rust-resistant, acid-resistant and friction-resistant hard metal layer 13. The outer contour of the conveyor worm 10 is cylindrical at the lefthand longitudinal section and conical at the right hand longitudinal section.

Figure 2:
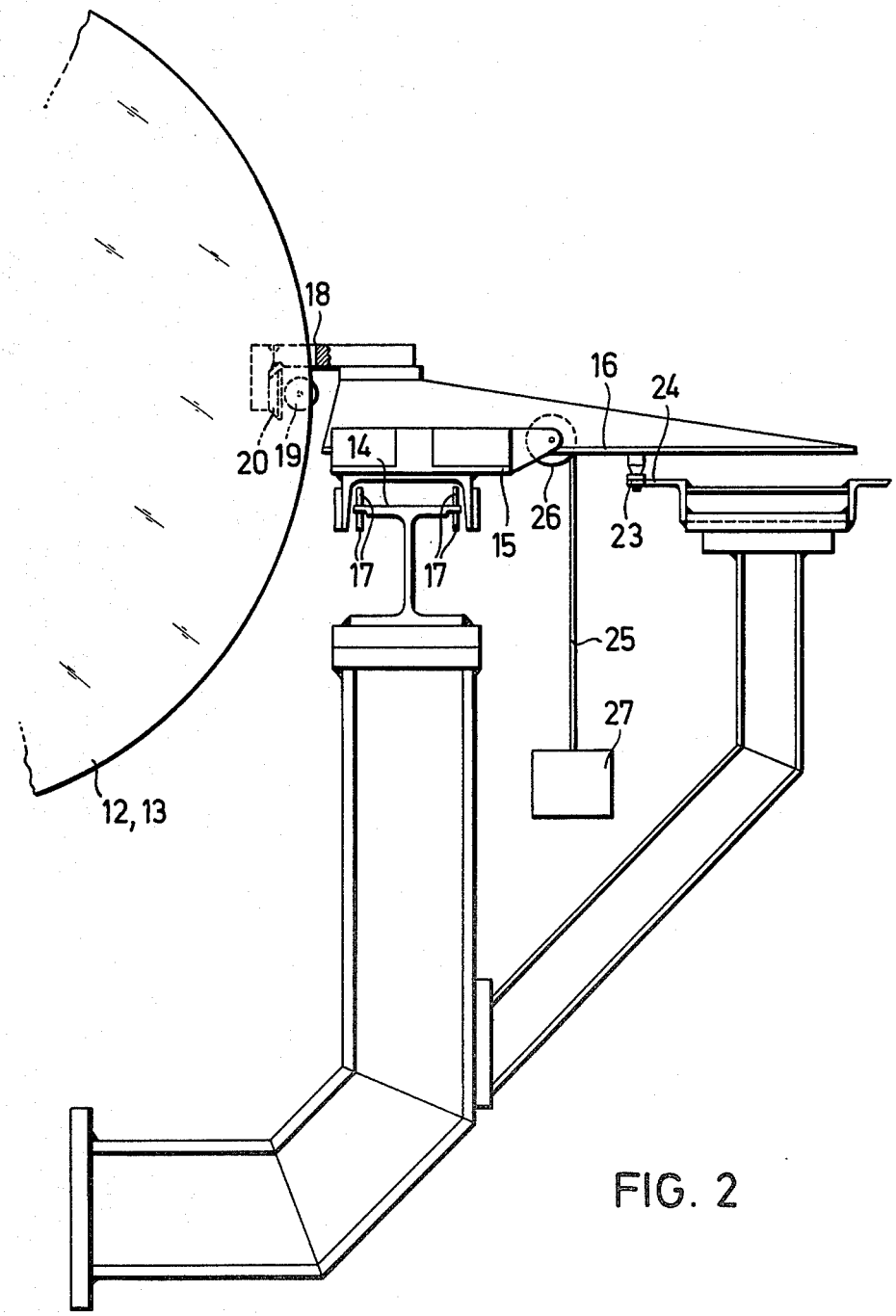
FIG. 2 shows the side view, viewed from the left, of the apparatus of FIG. 1.

Parallel to the axis of rotation of the worm 10 is arranged a guide rail or runway 14, on which is drivable a burner carriage which consists of a lower part 15 drivable parallel to the axis of the worm, on which is movable and drivable an upper part 16, movable perpendicularly to the axis of the conveyor worm. From the view of FIG. 2, it is apparent that the lower part 15 runs by means of wheels 17 on the runway 14. From the upper part 16 projects an arm 18, on which is held a plasma burner 19 with a burner nozzle which is directed parallel to the axis of rotation of the worm conveyor and is held at a slight spacing from its coils 12, 13, approximately 5—8 mm from the surface of the hard metal layer 13. An adjusting device 19' serves for the fine adjustment of the distance of the plasma burner 19 from the worm coils 13, 12.

Figure 1:
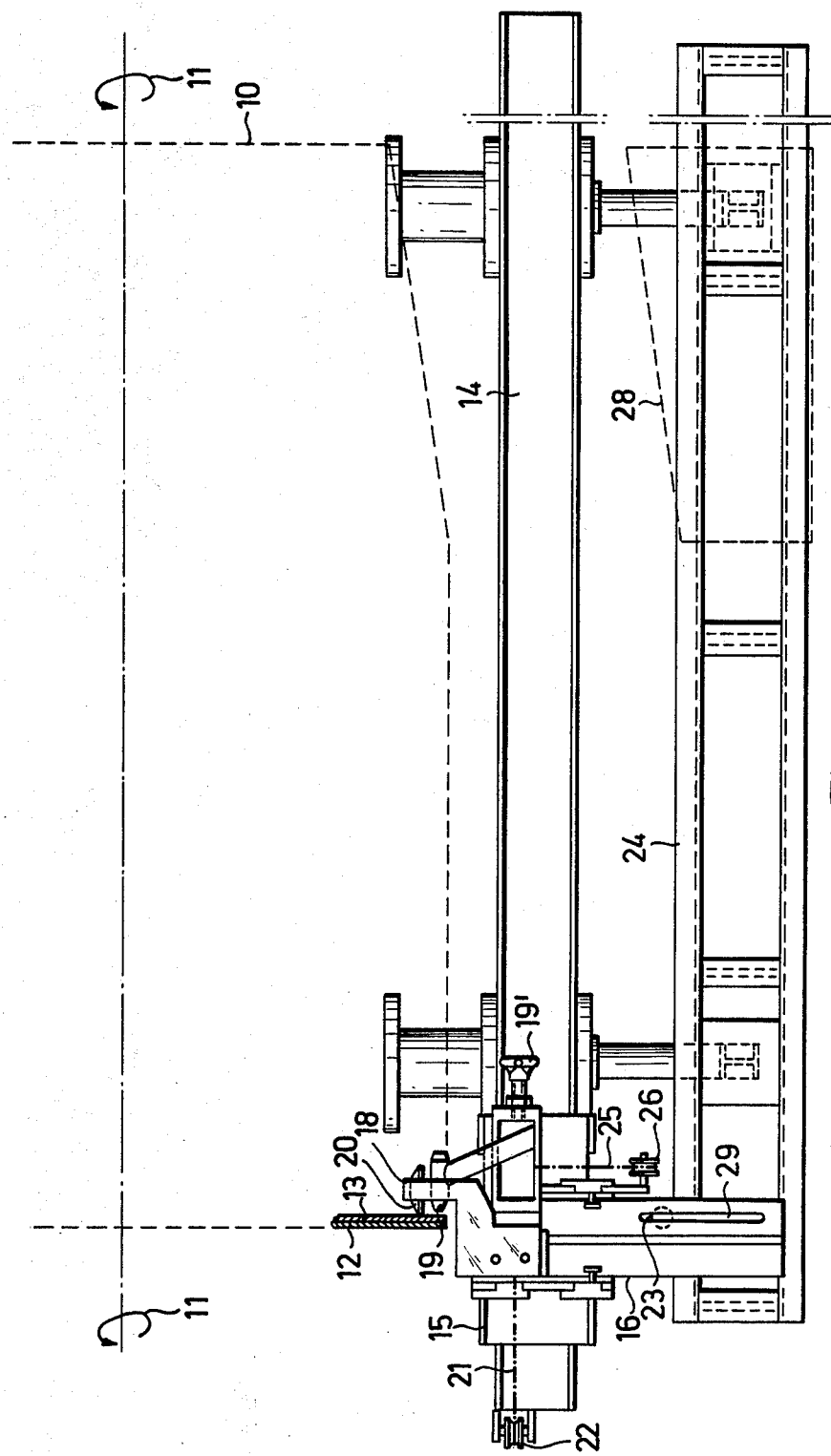
FIG. 1 shows, in a plan view, the gas or flame cutting apparatus according to the invention.

At a slight spacing from the plasma burner 19, approximately 20 mm removed therefrom and disposed more to the center of the worm, the arm 18 carries a scanning roller 20, which constantly bears on the thrust side of the worm coils and which, upon rotation of the worm, automatically slides the upper part 16 and therewith also the lower part 15 with the conveyor worm speed of the worm 10 to the right side in FIG. 1. The speed of the burner cutting is determined by means of the rate of rotation of the worm. If the rate of rotation is great, also the burner or combustion rate is great, and vice versa. With too small a burner or combustion rate, there results an arris or burr which must subsequently be ground away. The greater the diameter and therewith the circumferential speed of the worm to be treated, the smaller must be therrate of rotation, and vice versa. With a correctly adjusted burning speed there results a completely clean, sectional surface free from arris or burr, which no longer needs to be subsequently treated. As optimal burning speeds the following was found: at a worm coil of VA—pure steel of 8 mm thickness, approximately 500 to 600 mm per minute; with a coil of RSt 37 of 6 mm, approximately 1000 mm per minute; and with a coil of 4 mm with a hard metal coating of 4 mm, approximately 500 mm per minute. The excess burnt off by the plasma burner 19 from the worm coil may be approximately 6 mm wide.

A particular advantage of the device according to the invention, consists therein, that the clean sectional surface, which results by means of the plasma burning, is coated by means of smelting of the hard metal layer 13 during the burning operation, by itself with the hard metal.

To the burner carriage 15, 16 through a cord 21, which is guided downwardly through a roller 22, a counterweight is connected which urges the scanning roller 20 to constant bear against the thrust side of the worm coils 13, 12, so that the burner carriage pushed forward by the worm coils cannot move ahead. The carriage may also be secured against moving ahead by means of a friction brake. For the adjustment and maintenance of the finished diameter of the worm 10 to be treated, the upper part 16 has a guide roller 23, which is held in abutment or contact with a pattern guide rail 24 arranged longitudinally to the axis of the worm conveyor. For the purpose, there engages on the upper car 16 through a cord 25 which is guided downwardly through a roller 26, a counterweight 27, through which the guide roller 23 remains constantly pressed against the guide rail 24.

So that the plasma burner 19 cannot gas- or flame-cut only a cylindrical outer contour of a worm conveyor to finished measurement, but also a conical outer contour, which is present on the right hand longitudinal section of the worm 10 of FIG. 1, there is fixable on the pattern guide rail 24 a pattern section 28 extending inclined thereto, in such manner, that the guideway formed by guide rail 24 and pattern 28 along which runs the guide roller 23 of the upper part 16, extends parallel to the outer contour of the worm conveyor 10 having the conical longitudinal section.

For the adjustment of different finished diameters of the worm conveyor to be treated, the upper part 16 has a longitudinal slot 29 extending perpendicularly to the pattern guide rail 24 or perpendicularly to the axis of rotation of the worm, respectively, in which longitudinal slot the guide roller 23 is displaceable and arrestable. For the fine adjustment in the narrowest tolerances, the longitudinal slot 29 according to FIG. 2 has a measuring device, which consists of a millimeter-scale 30, on which is slidable a nonius or vernier 31, on which, by means of two wrench-screws 32 and 33, may be fastened from above a clamping member 34 and from below a holder 35, which carries the guide roller 23.

A similarly constructed measuring device may also be used for the attachment of and adjustment of the pattern section 28 on the pattern guide rail 24.

Although we have described our invention by reference to certain illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. Apparatus for cutting a desired edge contour of a worm which is to be used as a worm conveyor, comprising:

first means for rotating the worm about its longitudinal axis;

second means mounted for movement parallel to said longitudinal axis including a member for engaging the helix thrust surface of the rotating worm and be pushed along thereby to automatically move said second means along said worm;

a cutting torch movably mounted on said second means and directed toward said worm parallel to said longitudinal axis; and third means for moving said cutting torch in the direction of said longitudinal axis, as said second means moves, in accordance with the desired edge contour to be formed on said worm.

2. Apparatus for the treatment of the outer contour of a worm conveyor, comprising:

rotating means including mounting means for mounting a worm conveyor for rotation about its longitudinal axis and a rotary drive for rotating the worm conveyor;

a pattern corresponding to the desired contour of the conveyor mounted alongside said worm conveyor;

a cutting torch;

a guide mounted parallel to the longitudinal axis of the worm conveyor;

a carriage including a first part mounted for movement along said guide, and a second part mounted on said first part for movement transversely of said longitudinal axis, said second part carrying said cutting torch to cut parallel to said longitudinal axis and engaging and transversely moved by said pattern; and scanning means carried by said second part to engage the thrust surface of the rotating worm conveyor and automatically pull said carriage along said guide.

3. The apparatus of claim 2, wherein:

said guide includes a plurality of rollers spaced apart along the length thereof to rollingly support said carriage.

4. The apparatus of claim 2, wherein:
said second part of said carriage comprises an arm extending toward said longitudinal axis and carrying said scanning means.

5. The apparatus of claim 4, wherein:
said scanning means comprises a wheel which engages said thrust surface.

6. The apparatus of claim 2, comprising:
means connected to said carriage for urging said scanning means into engagement with said worm.

7. The apparatus of claim 2, comprising:
means connected to said second part of said carriage to urge said second apart against said pattern.

8. The apparatus of claim 2, wherein:
said torch comprises a plasma torch.

9. The apparatus of claim 2, wherein:
said torch comprises an electron beam torch.

10. The apparatus of claim 2, wherein:
said torch comprises a laser beam torch.

11. Apparatus for trimming a continuously convoluting edge of a worm, comprising:
means for rotating the worm about its longitudinal axis;
a guide rail extending alongside of the rotating worm parallel to said longitudinal axis;
a carriage including a first part mounted for movement along said guide rail and a second part mounted for movement on said first part transversely of said guide rail;
an arm extending from said second part and a wheel on said arm;
first biasing means connected to said carriage to urge said wheel against the thrust surface of said worm so that rotation of said worm automatically cams said carriage along said guide;
a cutting torch mounted on said arm and including a nozzle directed parallel to said longitudinal axis and slightly spaced from the thrust surface of said worm and operable to trim off excess edge material as said worm rotates and moves said carriage;
a pattern corresponding to the desired contour of the worm, said pattern extending alongside of said worm; and
second biasing means connected to said second part of said carriage to urge said second part against said pattern so that said pattern constitutes a cam for said second part for transverse movement.

12. The apparatus of claim 11, wherein:
said second part of said carriage comprises a roller which is adjustably mounted transversely of said second part, said roller engaging and cammed by said pattern.

13. The apparatus of claim 12, wherein:
said second part comprises a scale adjacent said roller to aid in setting said second part to the desired diameter of said worm.

14. The apparatus of claim 13 wherein:
said pattern includes at least one adjustable portion which is mounted for adjustment transversely of said worm.

15. The apparatus of claim 14, wherein:
said pattern comprises at least one scale to aid in setting said pattern for a predetermined worm contour.

* * * * *